United States Patent [19]

Mizelle

[11] 4,365,837
[45] Dec. 28, 1982

[54] INERTIAL LOCK

[75] Inventor: Ned W. Mizelle, Lexington, Ky.

[73] Assignee: Hoover Universal, Inc., Saline, Mich.

[21] Appl. No.: 240,773

[22] Filed: Mar. 5, 1981

[51] Int. Cl.³ .................... B60R 21/10; B60N 1/02
[52] U.S. Cl. .................................. 297/216; 297/379
[58] Field of Search ............................. 297/216, 379

[56]     References Cited
       U.S. PATENT DOCUMENTS

| 4,103,967 | 8/1978 | Tanaka et al. | 297/379 X |
| 4,219,234 | 8/1980 | Bell | 297/379 X |
| 4,318,569 | 3/1982 | Bilenchi et al. | 297/379 |

Primary Examiner—William E. Lyddane
Attorney, Agent, or Firm—Olsen and Stephenson

[57]     ABSTRACT

An inertial lock mechanism for limiting movement of a first object along a constrained path with respect to an adjacent second object. The mechanism includes a lock pin having a flat surface which is pivotally mountable to the first object and is biased toward a position in which the flat surface is parallel to the contrained path. A frame member mountable to the second object engages the flat surface so as to stop relative movement of the pin and rotate the pin against the biasing means at one end of the constrained path. A second stop surface on the frame member is sufficiently spaced apart from the angular surface to permit the biasing means to overcome inertia and pivot the lock pin out of engageable relationship with the second stop surface except when a predetermined amount of relative acceleration of the two objects occurs.

8 Claims, 4 Drawing Figures

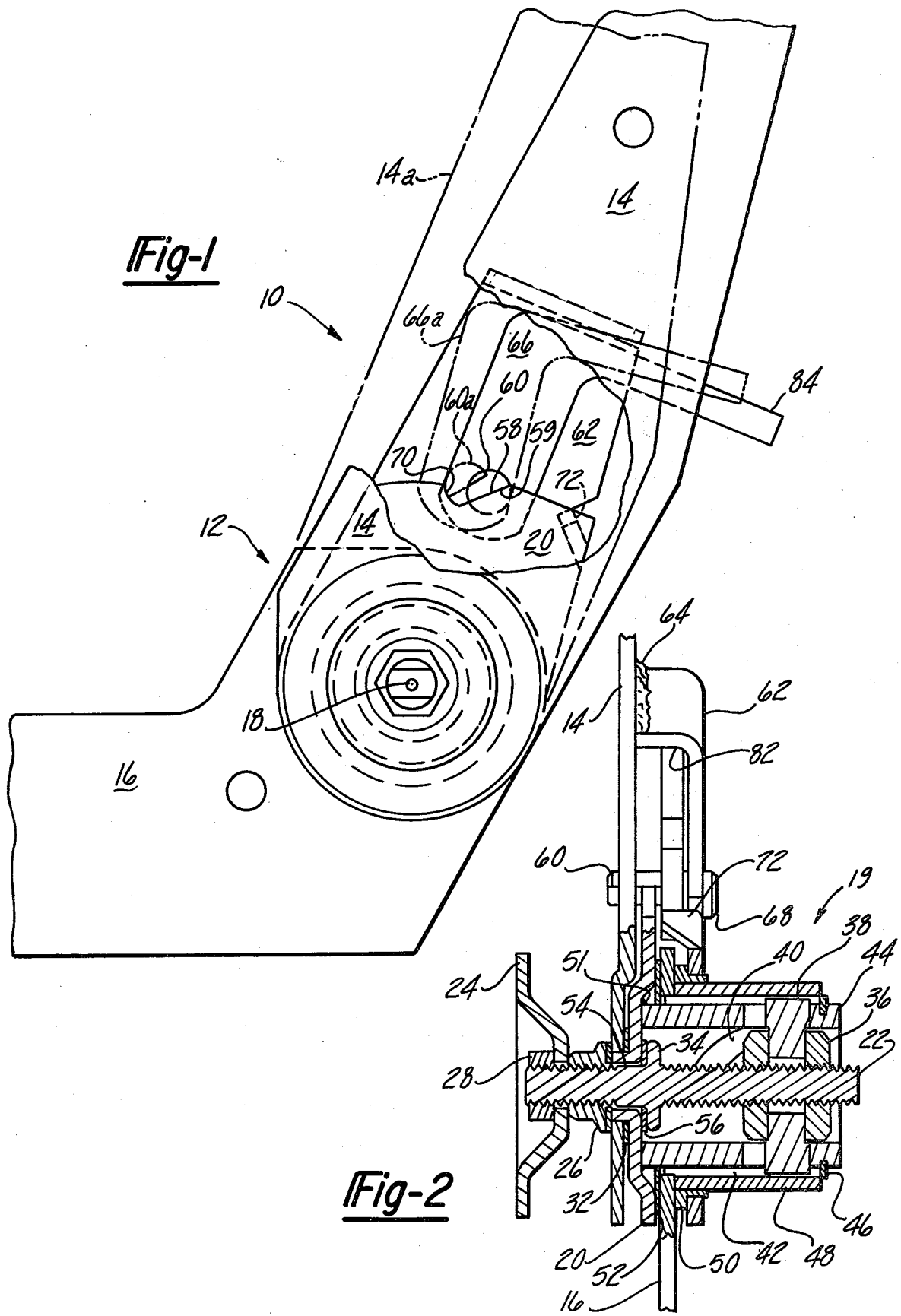

INERTIAL LOCK

BACKGROUND OF THE INVENTION

1. Field of the Invention

The present invention relates to inertial lock mechanisms, and, more particularly, to a mechanism which normally permits free relative movement between two adjacent objects but which prevents relative movement when a predetermined relative acceleration occurs.

2. Description of the Prior Art

In recent years, inertial lock mechanisms have become increasingly common, typically as safety devices in vehicles. Such mechanisms, for example, assist in anchoring seat belt straps by means of inertial reels which lock in the event of a collision of the vehicle. Generally, these inertial locks utilize centrifugal forces generated during rapid rotation of the inertial reels to engage a friction or latch means which is not engaged when the inertial reels are more slowly rotated. These devices are best suited to applications having relatively high rotational speeds, such as automobile seat belt spools which spin when the seat belt straps are pulled from the spools.

One of the most significant dangers present in the passenger compartment of a vehicle during a crash is the forward folding of the seat backs. Because seat backs in many automobiles must fold forwardly to permit access to an area behind the seats, such seat backs are now usually equipped with lock mechanisms. Generally, these mechanisms are merely simple latches with manual levers for disengaging the latches so as to permit forward folding of the seats when access is desired. Folding of the seat backs equipped with such lock mechanisms is inconvenient, particularly due to the usual positioning of the latch release levers near the seat back hinges or on the rearward side of the seat backs.

Inertial lock mechanisms have not been utilized in conjunction with forwardly folding vehicle seat backs due to the absence of the high rotational speeds required for inertial reel operation. Accordingly, it is an object of the present invention to provide an inertial lock mechanism suitable for use with forwardly folding vehicle seat backs. It is a further object of the present invention to provide an inertial lock mechanism which is adaptable to a wide variety of applications and which is not dependent upon high rotational speeds such as those required for inertial reel use.

SUMMARY OF THE INVENTION

The present invention is an inertial lock mechanism for preventing relative movement between a first object and an adjacent second object over which the first object normally moves along a constrained path. The inertial lock mechanism comprises a lock pin pivotally mountable to the first object, a biasing means for urging pivoting of the lock pin to a biased position, and a frame member mountable to the second object in registration with the lock pin. The frame member engages the lock pin to prevent relative movement of the first object when the first object is accelerated at a predetermined rate relative to the second object.

More specifically, the structure and operation of the inertial lock mechanism are as follows: The lock pin follows a constrained path corresponding to the constrained path of the first object and pivots about an axis perpendicular to its constrained path. The lock pin includes a generally flat surface which is urged by the biasing means into an orientation parallel to the lock pin constrained path. The frame member has an angular surface which is angularly disposed with respect to the biased position of the flat surface of the lock pin and which protrudes into the lock pin constrained path so as to stop relative movement of the first object at one end of its path. Engagement with the frame member angular surface rotates the lock pin against the biasing means and displaces the lock pin flat surface from its orientation parallel to the lock pin constrained path. The frame member further has a stop surface protruding into a part of the lock pin path and spaced somewhat apart from the angular surface. When the first object is moved over the second object at a normal rate, the biasing means pivots the lock pin to its biased position before the lock pin reaches the stop surface so that the lock pin passes over the frame member stop surface without engagement therewith. When a predetermined amount of acceleration causes rapid movement of the lock pin from the frame member angular surface to the frame member stop surface, the biasing means is unable to overcome inertia and return the lock pin to its biased position during the short period of time before the stop surface is reached. Therefore, the frame member engages a part of the lock pin to stop relative movement of the first object.

As a result of the present invention, the convenience of an intertial lock mechanism can be realized in a wide variety of applications without the necessity of high rotational speeds such as those required by an inertial reel. Further, as illustrated in the preferred embodiment, the inertial lock mechanism of the present invention is adaptable for use with forwardly folding vehicle seat backs so as to eliminate the necessity of manual latch releases. Further objects, features, and advantages of this invention will become apparent from a consideration of the following description, the appended claims, and the accompanying drawings.

BRIEF DESCRIPTION OF THE DRAWINGS

FIG. 1 is a side elevational view of a hinge of a forwardly folding automobile seat equipped with the inertial lock mechanism of the present invention showing the seat back in the upright position together with a phantom outline showing the seat back in the locked position as during an automobile crash;

FIG. 2 is a rear elevational view of the hinge and inertial lock mechanism of FIG. 1 with a part of the hinge structure broken away;

DESCRIPTION OF THE PREFERRED EMBODIMENT

Figure 3:
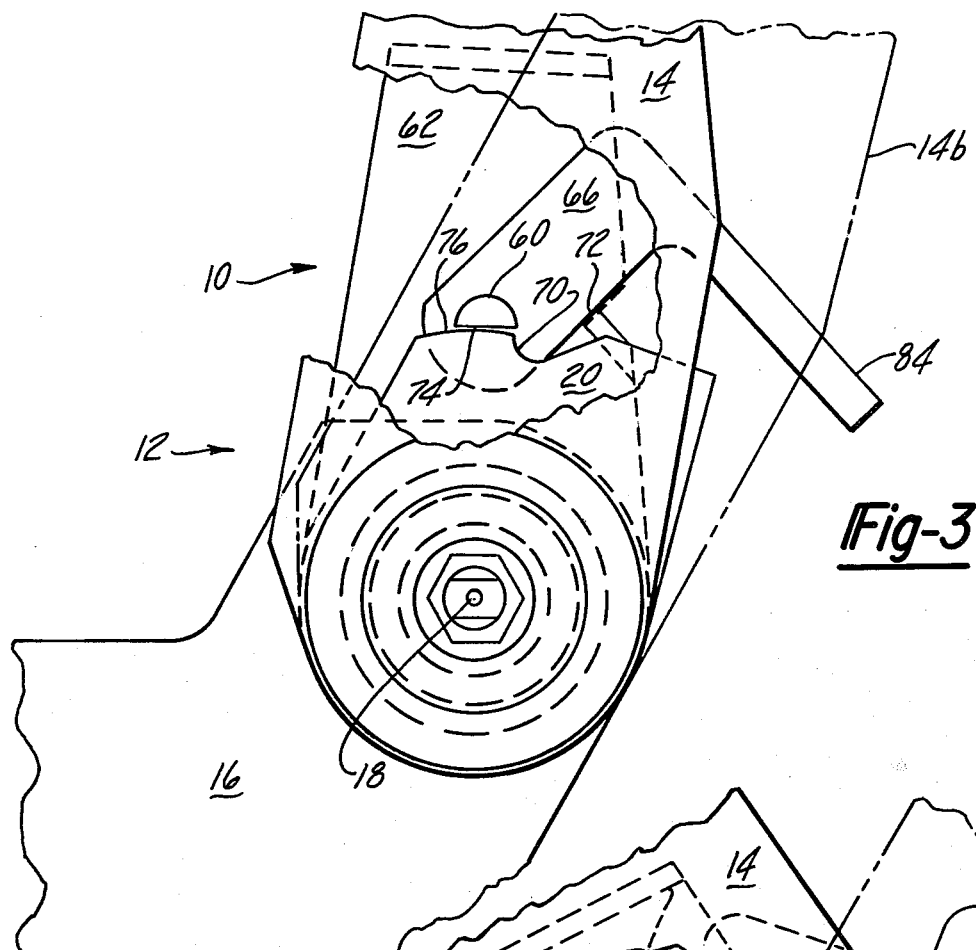
FIG. 3 is a side elevational view of a hinge of a forwardly folding automobile seat equipped with the lock mechanism of the present invention showing the seat back in an intermediate forwardly folded position.

With reference to the drawing, the inertial lock mechanism of the present invention, indicated generally at 10, is illustrated in FIG. 1 in operating relation to a hinge of a forwardly folded automobile seat, indicated generally at 12. The hinge mechanism 12 provides for forward pivoting of the seat back mounting bracket 14 relative to a seat cushion mounting bracket 16 about a pivot point 18. The inertial lock mechanism 10 is mounted upon both the seat back mounting bracket 14 and the seat cushion mounting bracket 16 such that it restrains the seat back mounting bracket 14 from forward pivoting about pivot point 18 from a generally upright position.

The hinge mechanism 12 of the preferred embodiment includes a reclining mechanism as disclosed in my copending patent application Ser. No. 110,814, now U.S. Pat. No. 4,291,914. As shown in FIG. 2, the reclining mechanism, generally indicated at 19, rotates a recline plate 20 about a drive screw 22 aligned with pivot point 18 in response to a manual rotation of a reclining handle 24. The reclining handle 24 is secured to the drive screw 22 by means of a flange nut 26 and a jam nut 28. The drive screw 22 pivots against thrust washers 30 and 32 secured by the flange nut 26 and an integral flange 34 and engages a cam nut 36 which is threaded onto the drive screw 22. A pair of shoulder dowel pins aligned radially within the cam nut 36 protrudes outward from the cam nut 36 to engage splines 40 and 42. The interior spline 40 is helical in configuration and extends through an interior cam tube 44. The interior cam tube 44 is pivotally secured by means of a retaining ring 46, an exterior splined tube 48, and a flanged bushing 50 which is fixed to the seat cushion mounting bracket 16. The splines 42 are aligned longitudinally and extend partially through the thickness of the exterior splined tube 48. Thus, in response to rotation of the drive screw 22 by the reclining handle 24, the shoulder dowel pins 38 move with the cam nut 36 along the drive screw 22 causing relative rotation between the exterior splined tube 48 and the interior splined tube 44. The recline plate 20 is welded to the interior splined tube 44 at 51 and spaced from the seat cushion mounting bracket 16 by a thrust washer 52. The recline plate 20 rotates with the interior splined tube 44, the exterior splined tube 48 being fixed to the seat cushion mounting bracket 16.

The forward pivoting of the seat back mounting bracket 14 with respect to the seat cushion mounting bracket 16 about pivot point 18 can be easily seen in FIG. 2. At any preset reclining position of the seat back mounting bracket 14, the recline plate 20 is fixed with respect to the seat cushion mounting bracket 16. Accordingly, pivoting of the seat back mounting bracket 14 about pivot point 18 occurs at a recline plate flange 54, the seat back mounting bracket 14 being held in longitudinal position by thrust washers 32 and 56.

The seat back mounting bracket 14 is held in a normal upright position against a rearward stop by the force of gravity. This rearward stop results from the engagement of an angular surface 58 of the recline plate 20 by a flat surface 59 of a lock pin 60 which protrudes through the seat back mounting bracket 14 at right angles thereto. The lock pin 60 is rotatably mounted by means of a circular hole within the seat back mounting bracket 14 and is supported at its opposite end by means of a circular hole in an inner pivot bracket 62. The inner pivot bracket 62 is welded to the seat back bracket 14 at 64 at its upper end and is rotatably mounted at its lower end upon the seat cushion mounting bracket 16 by means of the flange bushing 50. A lock lever 66 is fixedly mounted to the lock pin 60 and is, therefore, free to rotate with the lock pin 60 with respect to the seat back mounting bracket 14 and the inner pivot bracket 62. The lock pin 60 is held in longitudinal position by a shouldered cap 68 of the lock pin 60 slideably engaging the inner pivot bracket 62.

The inertial lock mechanism of the present invention operates as follows. When the seat back mounting bracket 14 is rapidly pushed forward with sufficient acceleration with respect to the seat cushion mounting bracket 16, the lock pin 60 engages a concave pin seat 70 which is formed in the perimeter of the recline plate 20 positioned in proximity to the angular surface 58. The concave pin seat 70 is spaced somewhat from the angular surface 58 to permit normal pivoting of the seat back mounting bracket 14 as described below. The phantom lines 14a, 66a, and 60a in FIG. 1 show the seat back mounting bracket 14, the lock lever 66, and the lock pin 60 in their respective forward lock positions as would occur during a crash of the vehicle.

In contrast to the locking of the seat back during a crash, a slow forward pivoting of the seat back mounting bracket 14 about the pivot point 18 with respect to the seat cushion mounting bracket 16 encounters no locking action by the lock pin 60. As shown in FIG. 3, the spacing between the concave pin seat 70 and the angular surface 58 permits the lock lever 66 and the lock pin 60 which is fixedly mounted thereto to rotate clockwise with respect to the recline plate 20 and the inner pivot bracket 62 under the force of gravity until engaging the rear stop 72. In the preferred embodiment, the rear stop 72 is formed integral with the inner pivot bracket 62 as a right angled tab notching the perimeter of the inner pivot bracket 62. The rearward stop 70 is positioned such that the lock lever 66 biases the lock pin 60 under the force of gravity to a position wherein the flat surface 59 of the lock pin 60 is at right angles to a radius from the pivot point 18. In this position, the flat surface 59 is directed along the path of the lock pin 60 resulting during forward pivoting of the seat back mounting bracket 14. Thus oriented, the lock pin 60 clears the outward perimeter 76 of the recline plate 20 to permit forward pivoting of the seat back mounting bracket 14 to a forward stop position. As a reference, the phantom lines 14b of FIG. 3 indicate the normal upright position of the seat back mounting bracket 14 from which the seat back mounting bracket has been pivoted.

Figure 4:
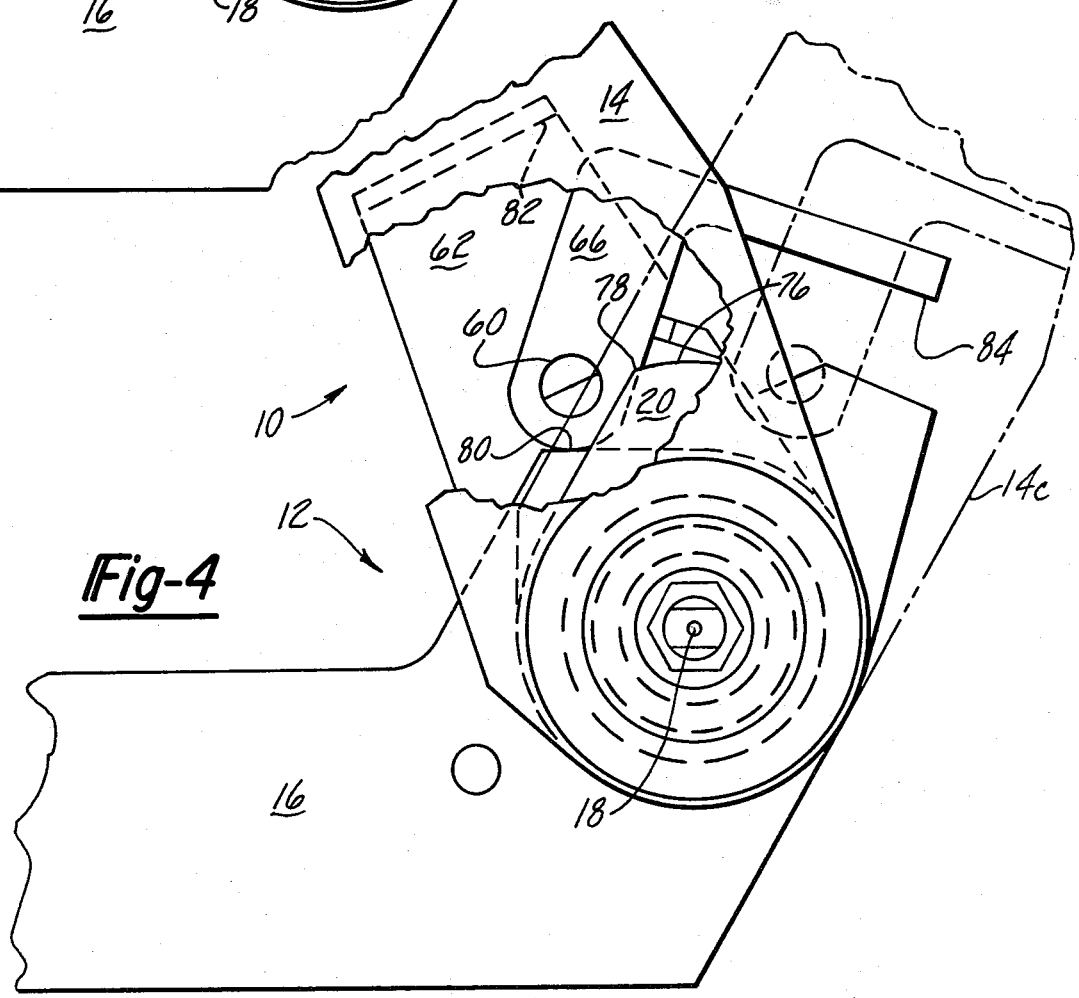
FIG. 4 is a side elevational view of a hinge mechanism of an automobile forwardly folding seat equipped with the inertial lock mechanism of the present invention showing the seat back in its full forwardly folded position.

FIG. 4 shows the forward stop of the seat back mounting bracket 14 in the full forwardly pivoted position. As the seat back mounting bracket 14 pivots forward, the flat surface 74 of the lock pin 60 continues to be held in alignment with the path of the lock pin 60 by the perimeter 76 of the recline plate 20 and the biasing of the lock lever 66 against the rearward stop 72. The perimeter 76 of the recline plate 20 is terminated at point 78 to permit a more compact mechanism and avoid interference with seat comfort or appearance. The forward stop is provided by the engagement of an upper surface of the seat cushion mounting bracket 16 at 80 by the lock lever 66 adjacent the lock pin 60. Further, it should be noted that the lock lever 66 is a relatively massive arm extending upward and to the rear from the lock pin 60 throughout the range of travel to maintain its biasing effect on the lock pin 60 due to the force of gravity. The lock lever 66 is constrained against excessive counterclockwise rotation by the inner pivot bracket 62 which is bent at a right angle at 82 in order to clear the lock lever 66 and to form a stop surface for the lock lever 66. As shown in the preferred embodiment, the lock lever 66 may be formed with a second arm 84 extending at right angles from the first arm so as to protrude through the seat back and serve as a lever for manual operation in the event of a jam of the inertial lock mechanism.

It will be seen from the foregoing description of the preferred embodiment that the present invention achieves the convenience of an interial lock mechanism without the necessity of high rotational speeds such as those required by an inertial reel. Further, it can be seen that the present invention is adaptable for use with forwardly folding vehicle seat backs so as to eliminate the necessity of manual latch releases. While the preferred embodiment has been described in considerable detail, the present invention is not to be limited to such detail except as may be necessitated by the appended claims.

What is claimed is:

1. An inertial lock mechanism for preventing relative movement between a first object and an adjacent second object over which said first object is normally movable in a constrained path, said mechanism comprising:
    (a) a lock pin pivotally mountable to said first object for pivotal movement about an axis perpendicular to said constrained path,
    said lock pin having a generally flat surface in a plane parallel to said lock pin axis;
    (b) biasing means for urging pivoting of said lock pin about said lock pin axis toward a position in which said flat surface is essentially parallel to said constrained path; and
    (c) a frame member mountable to said second object in registration with said lock pin,
    said frame member having an angular surface angularly disposed with respect to said position to which said flat surface is biased and engageable with said flat surface so as to stop relative movement of said first object at one end of said constrained path and rotate said lock pin against said biasting means,
    said frame member further having a stop surface protruding into the path of said lock pin, engageable with said lock pin only when said lock pin is angularly displaced from said biased position, so as to stop relative movement of said first object in a second and essentially opposite direction along said constrained path,
    said stop surface and said angular surface being sufficiently spaced apart so as to permit said biasing means to overcome inertia and pivot said lock pin out of engageable relationship with said stop surface except when a predetermined amount of acceleration of said first object causes rapid movement of said lock pin from said angular surface to said stop surface.

2. An inertial lock mechanism as defined in claim 1 wherein said constrained path is circular, said first object being pivotally mounted about an axis fixed with respect to said second object.

3. An inertial lock mechanism as defined in claim 2 which further includes a lock lever fixed to said lock pin and extending generally radially from said lock pin such that inertia of said lock lever tends to resist said biasing means and maintain said lock pin in said angularly displaced position so as to ensure positive engagement of said stop surface during said predetermined acceleration.

4. An inertial lock mechanism as defined in claim 1 wherein said biasing means comprises an arm fixed to said lock pin and stop means engageable with said arm when said flat surface is parallel to said constrained path, said arm being urged toward said stop means by the force of gravity.

5. An inertial lock mechanism as defined in claim 1 wherein said lock pin has a generally D-shaped cross-section consisting of a cylindrical surface about said lock pin axis in addition to said flat surface and wherein said stop surface is essentially concave and cylindrical to form a seat relationship with said cylindrical surface when said lock pin is angularly displaced from said biased position.

6. An inertial lock mechanism for use with a vehicle seat of the type having a seat back which is pivotable in a forward direction about a seat back axis transverse of said vehicle, said mechanism comprising:
    (a) a lock pin pivotally mountable to said seat back for pivotal movement about a lock pin axis parallel to and spaced apart from said seat back axis,
    said lock pin having a generally flat surface in a plane parallel to said lock pin axis;
    (b) biasing means for urging pivoting of said lock pin about said lock pin axis toward a position in which said flat surface is perpendicular to a radius from said seat back axis to said lock pin axis; and
    (c) a frame member mountable to said vehicle in registration with said lock pin,
    said frame member having an angular surface angularly disposed with respect to said position to which said flat surface is biased and engageable with said flat surface so as to stop rearward pivoting of said seat back and rotate said lock pin against said biasing means,
    said frame member further having a stop surface protruding into the path of said lock pin about said seat back axis and engageable with said lock pin only when said lock pin is angularly displaced from said biased position so as to stop forward movement of said seat back,
    said stop surface and said angular surface being sufficiently spaced apart so as to permit said biasing means to overcome inertia and pivot said lock pin out of engageable relationship with said stop surface when said seat back is pivoted forward except when said vehicle rapidly decelerates at a predetermined rate such as during a crash of said vehicle against a relatively stationary object.

7. An inertial lock mechanism as defined in claim 6 wherein said biasing means comprises an arm mounted upon said lock pin and stop means engageable with said arm when said flat surface is perpendicular to a radius from said seat back axis to said lock pin, said arm being urged toward said stop means by the force of gravity.

8. A seat for use in a vehicle comprising:
    (a) a seat cushion mountable to said vehicle so as to be generally horizontal;
    (b) a seat back pivotally mountable on said vehicle about an axis perpendicular to the direction in which said vehicle is movable so as to pivot from a normal backrest position to a forwardly folded position;
    (c) a lock pin pivotally mounted on said seat back for pivotal movement about a lock pin axis parallel to and spaced apart from said seat back axis,
    said lock pin having a generally flat surface in a plane parallel to said lock pin axis;
    (d) biasing means for urging pivoting of said lock pin about said lock pin axis toward a position in which said flat surface is perpendicular to a radius from said seat back axis to said lock pin axis;

(e) a frame member mountable to said vehicle in registration which said lock pin, said frame member having an angular surface angularly disposed with respect to said position to which said flat surface is biased and engageable with said flat surface so as to stop rearward pivoting of said seat back and rotate said lock pin against said biasing means, said frame member further having a stop surface protruding into the pivotal path of said lock pin about said seat back axis and engageable with said lock pin only when said lock pin is angularly displaced from said biased position so as to stop forward movement of said seat back, said stop surface and said angular surface being sufficiently spaced apart so as to permit said biasing means to overcome inertia and pivot said lock pin out of engageable relationship with said stop surface when said seat back is pivoted forward except when said vehicle rapidly decelerates at a predetermined rate such as during a crash of said vehicle against a relatively stationary object.

* * * * *